Aug. 8, 1939.  M. M. RODIN  2,169,127

BAG HOOK

Filed Sept. 29, 1938

Inventor
M. M. Rodin
By L. F. Randolph
Attorney

Patented Aug. 8, 1939

2,169,127

UNITED STATES PATENT OFFICE 2,169,127

BAG HOOK

Mate Mike Rodin, San Pedro, Calif.

Application September 29, 1938, Serial No. 232,461

1 Claim. (Cl. 294—26)

This invention relates to a bag hook or handling implement or the like.

It is aimed to provide a novel structure having a plurality of bag-engaging tines and a structure which is capable of expeditious manufacture, even in a single piece, and one having corrugations alternately extended to provide the tines and with the extended portions reversed to complete the formation of the tines.

The more specific objects and advantages will become apparent from a consideration of the description following taken in connection with the accompanying drawing illustrating an operative embodiment.

In said drawing:—

Figure 1:
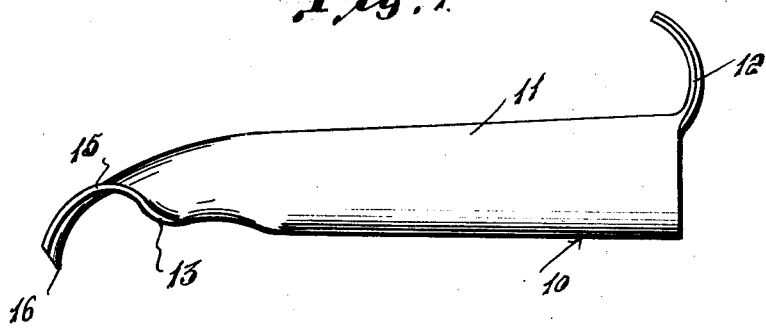
Figure 1 is a view of the implement in side elevation.
Figure 2:
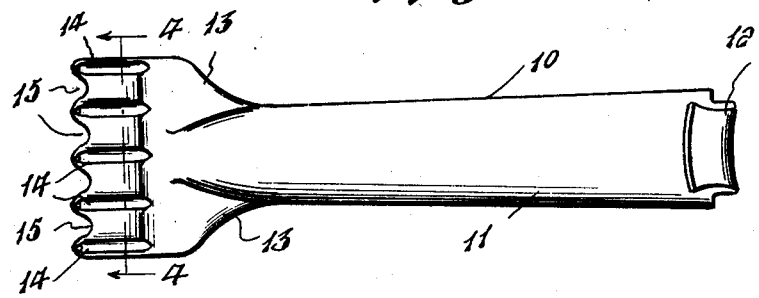
Figure 2 is a top view thereof.
Figure 3:
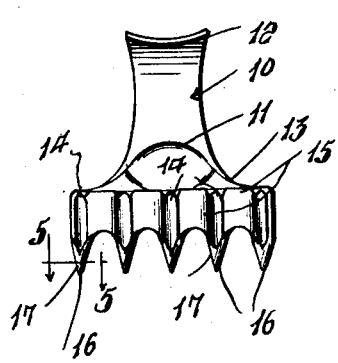
Figure 3 is a front elevation.
Figure 4:
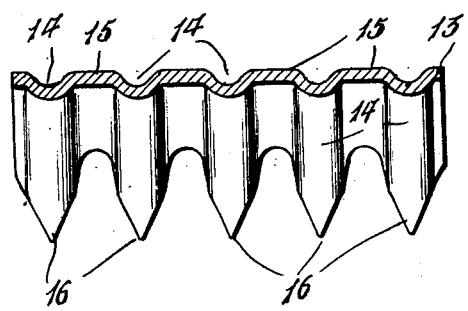
Figure 4 is an enlarged sectional view taken on the line 4—4 of Figure 2.
Figure 5:
Figure 5 is a cross sectional view taken on the line 5—5 of Figure 3.

Referring specifically to the drawing wherein like reference characters designate like or similar parts, the implement or tool is generally designated 10 and it may be formed from a single sheet or piece of metal of suitable gauge and hardness.

The sheet is formed into a hollow shank 11 constituting a handle, and provided with an integral hook 12 at one end extending outwardly therefrom, said hook aiding in preventing slippage of the device from the hand and also as a hook to engage a support.

Said sheet at the forward end of the handle is widened as at 13 and the forward portion thereof inwardly extends forwardly and downwardly, for instance being arcuate as shown, and provided with corrugations 14 and 15 in alternating relation. The corrugations 14 are extended beyond the corrugations 15 to provide bag-engaging or piercing tines 16. The metal of such extended portions or tines 16 is reversely bent as at 17 from opposite sides and into contact with each other, thereby reinforcing the tines, rendering them hollow, pointed and of the desired girth.

In the use of the device, part 11 is engaged in one hand and the tines 16 are engaged in the bag or bags to be handled.

It is obvious that the invention is not limited to use as a bag hook, since the construction of the tool lends itself to various other uses.

Various changes may be resorted to provided they fall within the spirit and scope of the invention.

I claim as my invention:

A tool of the class described having a handle, a plate integral with said handle and relatively wide with respect thereto, said plate having corrugations extending longitudinally thereof, alternate corrugations provided with tines at their distal portions, said tines formed by bending said portions in opposite directions and into contact to provide closed pointed terminals and spaces therebetween.

MATE MIKE RODIN.